Nov. 30, 1937.   D. C. PORTER   2,100,409
VEHICLE DIRECTION SIGNAL
Filed Nov. 26, 1935

Inventor
Donald C. Porter
A. B. Bouman
Attorney

Patented Nov. 30, 1937

2,100,409

UNITED STATES PATENT OFFICE 2,100,409

VEHICLE DIRECTION SIGNAL

Donald C. Porter, San Diego, Calif.

Application November 26, 1935, Serial No. 51,617

7 Claims. (Cl. 116—52)

My invention relates to a signal for indicating the direction an automobile or other vehicle is about to take, and the objects of my invention are:

First, to provide a vehicle directional signal which is mounted in connection with the window of the front door of the vehicle, and is operated and shifted to varying direction positions, by the conventional raising and lowering of the window in the vehicle door when the window is in nearly closed position.

Second, to provide a signal of this class which may be readily removed when it is not desired to use the same by simply lifting it from the upper edge of the window of the door of the vehicle.

Third, to provide a signal of this class which is in operating position when the window of the door is nearly closed, thus protecting the driver from the weather while operating or while the signal is in operation.

Fourth, to provide a signal of this class which is readily adaptable to the varying makes of the usually termed "closed vehicles."

Fifth, to provide a vehicle direction signal of this class which is very simple and economical of construction, easy to install, easy to operate, efficient in its action and which will not readily deteriorate or get out of order.

Sixth, to provide a vehicle direction signal of this class to be used in connection with closed vehicles which utilize the conventional window raising apparatus for operating the signal into varying signal positions and holding the same.

Figure 1:
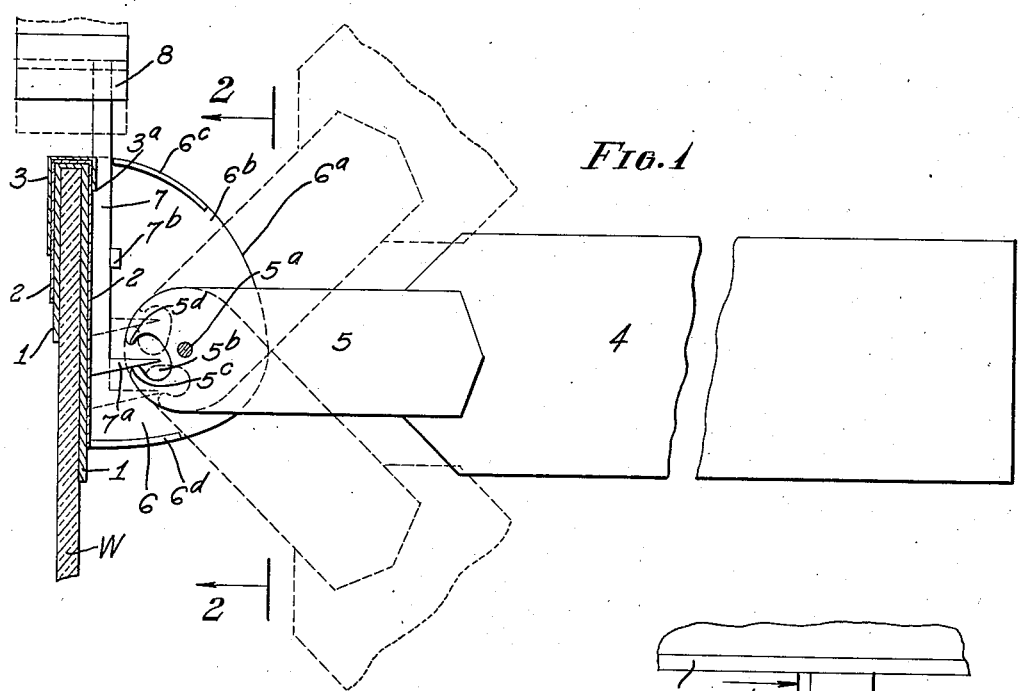
Figure 2:
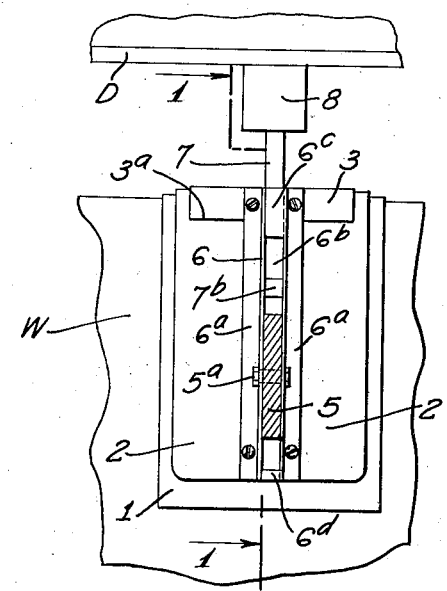
Figure 3:
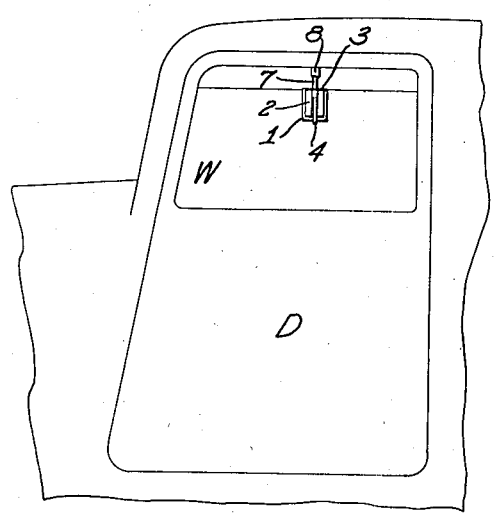

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application, in which, Figure 1 is a fragmentary front elevational view of my signal, showing by dotted lines varying signalling positions, and showing a portion in section through 1—1 of Fig. 2, and showing the signal mounted on a conventional automobile window and in certain relation to the door. Fig. 2 is a sectional view from the line 2—2 of Fig. 1, showing the window and door of the vehicle fragmentarily, and Fig. 3 is a side elevational view on a smaller scale of the vehicle door and window showing my signal mounted in position thereon.

Similar characters of reference refer to similar parts and portions throughout the several views of the drawing.

The signal supporting pad 1, supporting bracket 2, the reinforcing member 3, signal arm 4, signal arm support 5, signal arm supporting bracket 6, signal arm shifting bar 7, signal arm shifting bar knob 8 constitute the principal parts and portions of my vehicle direction signal.

The supporting bracket 2 is preferably a metallic plate which is an inverted U shape adapted to fit over the upper edge of the window in the door of the vehicle. The window I have designated W. The door I have designated D. The internal width of this bracket 2 is large enough to provide for the signal supporting pad 1 to be inserted between the bracket and the window W, as shown best in Fig. 1 of the drawing. It will be noted that this pad 1 extends slightly past the lower edges of the bracket 2 on the opposite sides of the window W and that this pad is made of rubber or fabric which is resilient, and provides a cushion to provide a tight fit all over the upper edge of the window W, but may be readily lifted off when the window W is lowered. This pad 1 is slightly wider than the bracket 2, as shown best in Fig. 2 of the drawing, thus providing a cushioned pad for the bracket which may be forced over the upper edge and is yieldable enough to provide a tight fit on the upper edge of the window, but may be readily removed by raising the same. The bracket 2 is preferably reinforced around its upper edge by means of a reinforcing member 3. However, it will be noted that the bracket 2 may be made heavy enough, if desired, so that the reinforcing 3 will not be required, it being noted that the bracket 2 must be rigid enough to hold the signal member in position on the upper edge of the window W. It will be noted that this reinforcing is also an inverted U shape, but does not extend downwardly as far as the member 2 on the inside, and only extends a short distance down on the outside, as shown at 3a. At the outer surface of the supporting bracket 2 and the reinforcement 3, is secured the signal supporting bracket 6 by means of flanges 6a at its opposite sides. This bracket 6 is hollow and provided with an open space, 6b, and its shape is shown best in Figs. 1 and 2 of the drawing. It is provided with an upper closed portion 6c which forms a stop for the upward movement of the signal and with a closed portion 6d at its bottom providing a stop for the lower position of the signal arm, as shown by the dotted line positions in Fig. 1 of the drawing.

Pivotally mounted in this bracket 6, and extending outwardly through the opening 6b in the outer edge thereof, is the signal arm support 5, supported on a pin 5a so that the member 5 may shift on this pin 5a upwardly until it reaches the closed portion 6c of the bracket 6, and downwardly until it reaches the closed portion 6d of the bracket 6, which show respectively the upper and lower shifted positions of the signal arm. Secured to the outward extending free end of the signal arm support 5 is the signal arm 4, which may be of considerably lighter material and of suitable length and width to be readily seen by drivers of other vehicles, pedestrians and the like. In the short inner end of the signal arm support 5 is provided a curved opening 5b, which is shown best in Fig. 1 of the drawing, and leaving extended round end portions 5c and 5d, which extended portions 5c and 5d are adapted to be engaged by the extended arm portion 7a of the signal arm shifting bar 7 which extends into the opening 5b, and is adapted to engage the portion 5c with the raising of the window W and engage the portion 5d with the lowering of the window W. The signal arm shifting bar 7 is shiftably supported in position against the outer surface of the member 2 and is supported centrally by bar 7b in the bracket 6, and at the upper end of the bracket by the inner edge of the closed portion 6c, thus providing for the shifting of the signal arm shifting bar 7. Secured on the upper end of the signal arm shifting bar 7 is a signal arm shifting bar knob 8, which is shown best in Figs. 1 and 2 of the drawing and adapted to engage the upper inner edge of the door D.

The operation of my vehicle direction signal is as follows: The pad 1, together with the bracket 2 is pressed down over the upper edge of the conventional upwardly and downwardly shiftable window in the conventional vehicle door, and because this pad 1 is yieldable, forms a tight and secure fit on the upper edge of the window. The knob 8 being secured to the shifting bar 7 is adapted to engage the upper inner edge of the conventional door of the vehicle, and by turning the window upwardly and downwardly in the conventional way, when nearly closed, the bar 7 is shifted relatively to the window thus shifting the support 5 and arm 4 so that the signal arm 4 may be positioned either in an upward position, a downward position or a straight out position which will remain this way as long as the window remains in the position. For instance, if the window W is turned upwardly the brackets 2 and 6 will move upwardly relatively to the signal arm shifting bar 7 which will cause the shifting arm support 5a to move on an incline upwardly and if reversed will turn downwardly as shown by dotted lines in Fig. 1 of the drawing, or may be positioned to a certain position so that it will extend horizontally as shown by solid lines in Fig. 1 of the drawing.

It being here noted that when the window is lowered, the weight of the arm carries the bar 7 upwardly relatively to the window when the upper edge is lowered sufficiently in the door.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a vehicle direction signal, the combination with a conventional closed vehicle door, with an upwardly and downwardly shiftable window, of a bracket mounted tightly on the upper edge of said window, a second bracket secured thereto and extending from one side thereof, a signal arm with one end pivotally mounted in said second bracket, and a signal arm shifting bar reciprocally mounted in said second bracket for engagement with said signal arm at one end and engageable with the upper inner edge of the door at its upper end.

2. In a vehicle direction signal, the combination with a conventional closed vehicle door, with an upwardly and downwardly shiftable window, of a bracket mounted tightly on the upper edge of said window, a second bracket secured thereto and extending from one side thereof, a signal arm with one end pivotally mounted in said second bracket, a signal arm shifting bar reciprocally mounted in said second bracket for engagement with said signal arm, and a knob secured on the upper end of said shifting bar engageable with the upper inner edge of the door.

3. In a vehicle direction signal, the combination with a conventional closed vehicle door, with an upwardly and downwardly shiftable window, of a bracket mounted tightly on the upper edge of said window, a second bracket secured thereto and extending from one side thereof, a signal arm with one end pivotally mounted in said second bracket, a signal arm shifting bar reciprocally mounted in said second bracket for engagement with said signal arm, and a knob secured on the upper end of said shifting bar engageable with the upper inner edge of the door, said signal arm provided with a curved opening in which one end of said shifting bar is received.

4. In a vehicle direction signal, the combination with a conventional closed vehicle door, with an upwardly and downwardly shiftable window, of a bracket mounted tightly on the upper edge of said window, a second bracket secured thereto and extending from one side thereof, a signal arm with one end pivotally mounted in said second bracket, a signal arm shifting bar reciprocally mounted in said second bracket for engagement with said signal arm, a knob secured on the upper end of said shifting bar, said signal arm provided with a curved opening in which one end of said shifting bar is received, and said knob positioned and arranged for engagement with the upper inner edge of the door with the shifting of said window.

5. In a vehicle direction signal, the combination with a conventional closed vehicle door, with an upwardly and downwardly shiftable window, of a bracket frictionally but readily removably secured on the upper edge of said window, said bracket provided with a portion extending from one side thereof on the outer side of the window, a signal arm with one end pivotally mounted in said bracket portion, and a signal arm shifting bar reciprocally mounted in said bracket for engagement with said arm for shifting said arm, said shifting bar being positioned and arranged for engagement with the upper inner edge of the vehicle door with the raising of said window.

6. In a vehicle direction signal, the combination with a conventional closed vehicle door, with an upwardly and downwardly shiftable window, of a bracket frictionally but readily removably secured on the upper edge of said window, said bracket provided with a portion extending from one side thereof on the outer side of the window, a signal arm with one end pivotally mounted in said bracket, a signal arm shifting bar reciprocally mounted in said bracket for engagement with said arm for shifting said arm, said shifting bar being positioned and arranged for engagement with the upper inner edge of the vehicle door with the raising of said window, and said signal arm provided with a curved opening in which one end of said shifting bar is received whereby said signal arm is shifted to varying positions with the raising and lowering of the window.

7. In a vehicle direction signal, the combination with a conventional closed vehicle door, with an upwardly and downwardly shiftable window, of a bracket frictionally but readily removably secured on the upper edge of said window, said bracket provided with a portion extending from one side thereof on the outer side of the window, a signal arm with one end pivotally mounted in said bracket, a signal arm shifting bar reciprocally mounted in said bracket for engagement with said arm for shifting said arm, said shifting bar being positioned and arranged for engagement with the upper inner edge of the vehicle door with the raising of said window, said signal arm provided with a curved opening in which one end of said shifting bar is received whereby said signal arm is shifted to varying positions with the raising and lowering of the window, and said shifting bar provided with a knob on its upper end for engagement with the vehicle door.

DONALD C. PORTER.